Jan. 8, 1935. J. W. CLEMENTS 1,987,361
VEHICLE BODY
Filed June 8, 1932 2 Sheets-Sheet 1
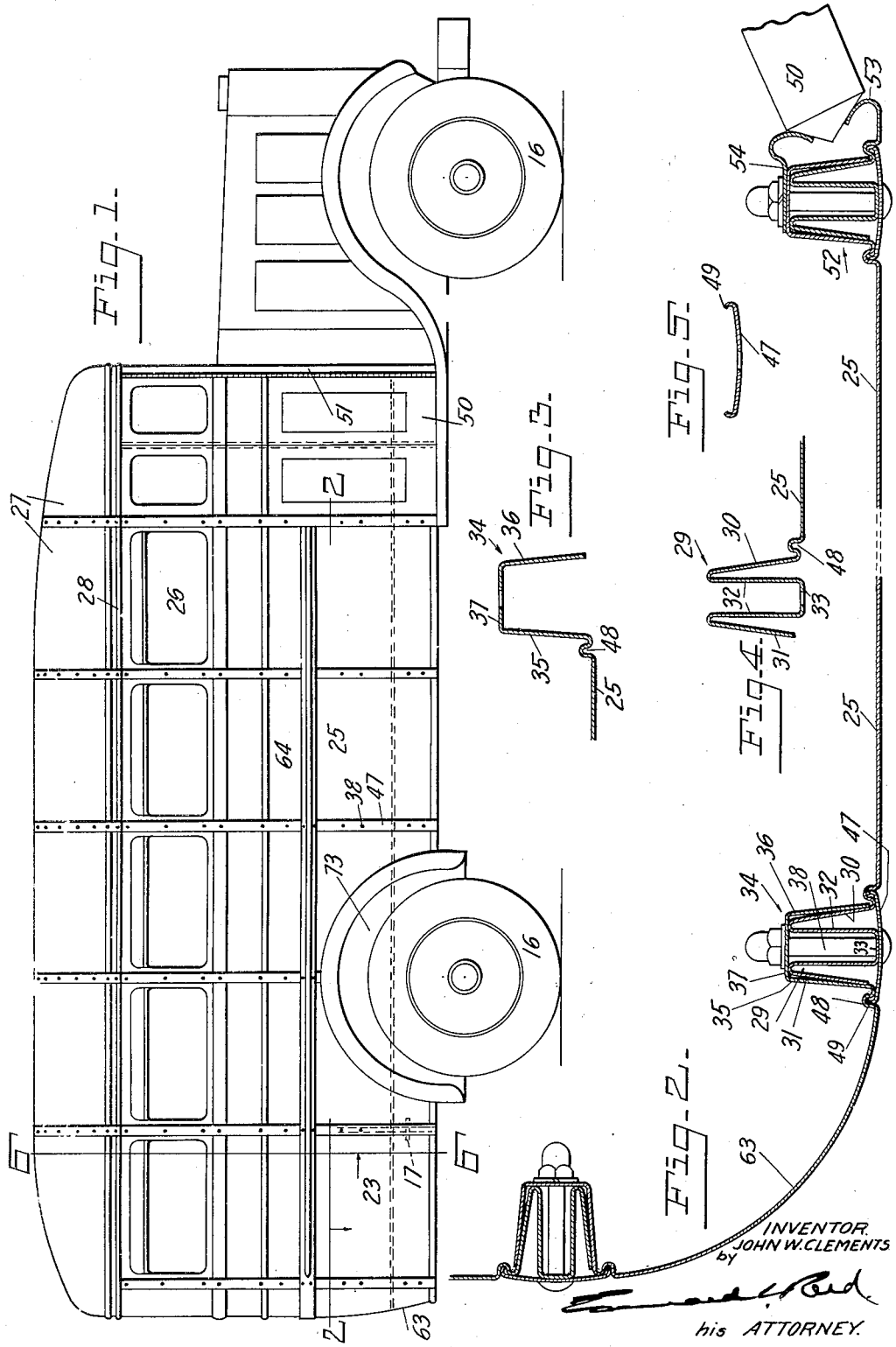
INVENTOR.
JOHN W. CLEMENTS
by
his ATTORNEY.

Jan. 8, 1935.　　　J. W. CLEMENTS　　　1,987,361
VEHICLE BODY
Filed June 8, 1932　　　2 Sheets-Sheet 2
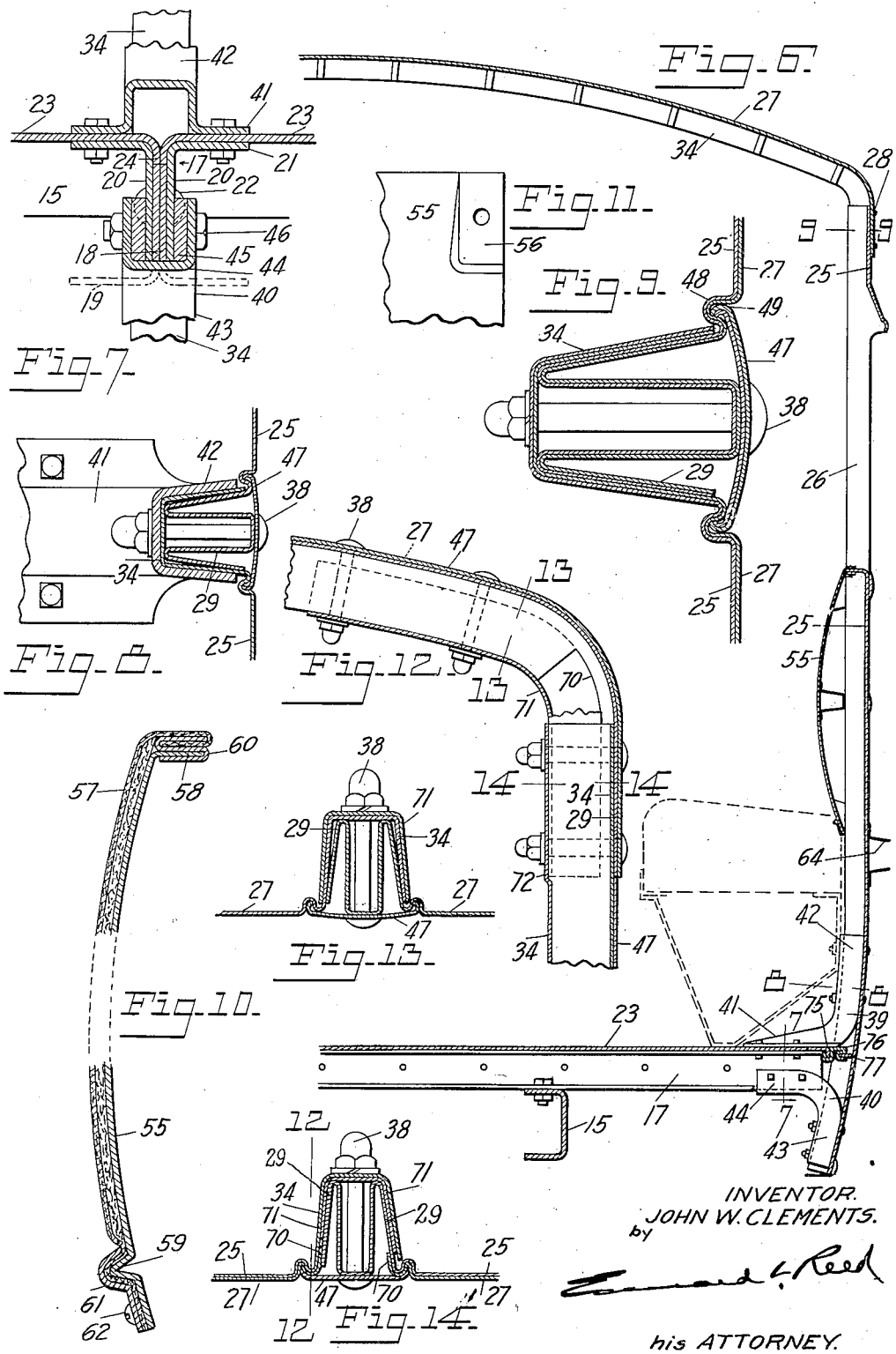
INVENTOR.
JOHN W. CLEMENTS.
by
Edward L. Reed
his ATTORNEY.

Patented Jan. 8, 1935

1,987,361

UNITED STATES PATENT OFFICE 1,987,361

VEHICLE BODY

John W. Clements, Richmond, Ind., assignor to The Wayne Works, Richmond, Ind., a corporation of Indiana Application June 8, 1932, Serial No. 616,085

13 Claims. (Cl. 296—28)

This invention relates to vehicle bodies and more particularly to bodies for large motor vehicles, such as passenger busses.

One object of the invention is to provide a vehicle body in which the upright walls and the top wall, or deck, will be formed of sheet metal and will be self-supporting without the use of a separate frame structure.

A further object of the invention is to provide a vehicle body formed of sheet metal panels having their edges connected by joints of such a character that they will provide the necessary support for the panels.

A further object of the invention is to provide the panels of such a vehicle body with integral parts so shaped that when placed in interlocking relation they will form strong reinforcing members of sufficient rigidity to properly support the panels.

A further object of the invention is to provide such a vehicle body in which the reinforcing or supporting members will be of such a character as to properly support the panels but will have sufficient flexibility to prevent, or to minimize, the loosening of the joints or other injury to the body due to the twisting strains or racking to which a long body is subjected.

A further object of the invention is to provide such a vehicle body in which the panels may be separated one from the other to permit the insertion or removal of panels to vary the size of the body.

A further object of the invention is to provide such a vehicle body in which the parts will be so constructed that they may be quickly and easily assembled or disassembled.

Other objects of the invention will appear as the construction is described in detail.

In the accompanying drawings Fig. 1 is a side elevation of a bus embodying my invention; Fig. 2 is a horizontal sectional view, taken through a part of the vertical walls of a bus body embodying my invention; Fig. 3 is a transverse section of an outer joint member; Fig. 4 is a transverse section of an inner joint member; Fig. 5 is a transverse section of a cover strip; Fig. 6 is a vertical section taken through one side of the vehicle body, on the line 6—6 of Fig. 1; Fig. 7 is a section taken on the line 7—7 of Fig. 6; Fig. 8 is a section taken on the line 8—8 of Fig. 6; Fig. 9 is a section taken on the line 9—9 of Fig. 6; Fig. 10 is a vertical section taken through the inner face plate; Fig. 11 is a detail view showing the manner of connecting the face plate to the upright wall of the body; Fig. 12 is a sectional view showing a modified form of connection between the vertical and transverse panels; Fig. 13 is a section taken on the line 13—13 of Fig. 12, shown in an inverted position; and Fig. 14 is a section taken on the line 14—14 of Fig. 12.

In these drawings I have illustrated one embodiment of the invention and have shown the same as applied to a school bus. It will be understood, however, that this particular embodiment has been chosen for the purpose of illustration only and that the body and the various parts thereof may take various forms and may be used for various purposes without departing from the spirit of the invention.

The vehicle body may be mounted on a wheeled support of any suitable character, such as an automobile chassis or a trailer. Such a chassis usually comprises a longitudinal frame, one member of which is shown at 15 in Fig. 6, and this frame is carried by wheels 16. The body comprises a floor structure, upright side and end walls and a top wall, commonly called a deck. The floor structure may be of any suitable character and preferably comprises a plurality of transverse beams 17. As here shown, each of these beams is made up of four angle members formed of suitable metal. The lower angle members having vertical flanges 18, arranged face to face, and horizontal flanges 19. The upper angle members have vertical flanges 20, arranged on the outer sides of and in contact with the vertical flanges of the lower angle members, and horizontal flanges 21. The several vertical flanges are connected one to the other, preferably by means of rivets 22. The beam thus constructed is of double channel or I-beam shape and by forming it of angle members a very strong rigid beam may be produced at a low cost. Rigidly secured to the several beams 17 are sheet metal floor plates 23. In the present construction the vertical flanges of the lower angle members terminate a short distance below the horizontal flanges of the upper angle members to provide a recess into which the down-turned edges 24 of the adjacent floor plates extend.

The upright or vertical walls of the body are formed of sheet metal panels 25, each panel being preferably of a length equal to the full height of the vertical wall. A part or all of the panels may be provided with window openings 26 to receive the usual window sash, which are not here shown. The top wall, or deck, is formed of a series of panels 27 extending transversely to the body and preferably of a width equal to the width of the corresponding vertical panels and having their ends turned downwardly and overlapping the upper ends of the vertical panels, as shown at 28 in Fig. 6. The several panels are provided at their longitudinal edges with parts forming joint members which cooperate to connect the adjacent panels one to the other and which are of such a character as to reinforce the panels and support the same. In the construction here illustrated the joint members on adjacent panels interlock and each main panel is provided at one longitudinal edge with an inner joint member and at the other longitudinal edge with an outer joint member. The terms "inner" and "outer" as used in connection with the joint members have reference to the relation of the joint members one to the other, and not to their positions with relation to the inner and outer sides of the walls. The joint members may be of various constructions but the particular joint here shown permits of the very easy assembly of the several panels and provides a very strong reinforcing member, which, while sufficiently rigid to properly support the panels, is more or less flexible and will yield sufficiently to prevent undue strain on the joints when the body is subjected to twisting strains. The joint members are formed of integral parts of the panel and project from the plane of the panel. Preferably they project inwardly with relation to the walls so as to locate the reinforcing members on the inner side of the walls and provide the body with a substantially smooth outer surface. The inner joint member, which is shown at 29 in Fig. 4, is formed by bending an edge portion of one of the panels inwardly and then folding the same upon itself to provide two outer walls 30 and 31 which converge slightly in an inward direction. Extending outwardly from the remote or inner edges of the side walls 30 and 31 are walls 32 which are preferably substantially parallel and which extend outwardly and are connected at their outer edges by a transverse portion 32 arranged in or adjacent to the plane of the panel. The joint member thus formed has approximately the shape of the letter M.

The outer joint member, which is shown at 34, in Fig. 3, is formed by bending the other edge portion of the panel inwardly and folding the same to provide a structure which is U-shaped in cross section and comprises side walls 35 and 36 which may diverge slightly toward the panel and which are connected at their remote or inner edges by a transverse member 37. In assembling the panels the outer joint member of one panel is placed over and in interlocking relation with the inner joint member of an adjacent panel and fits snugly about the same, the side walls of the outer member resiliently engaging the side walls of the inner member. The two joint members may be rigidly connected one to the other in any suitable manner but I prefer to employ detachable fastening devices, such as bolts 38, which extend through transverse members 33 and 37 of the two joint members and are arranged between the inner walls 32 of the inner joint member, which thus receive the strain imposed on the joint by the tightening down of the bolts. The joint thus formed between adjacent panels is of relatively large cross sectional area and comprises a plurality of thicknesses of metal, and therefore constitutes a very strong reinforcing member having a limited flexibility.

The reinforcing members or joints between the vertical panels of the body constitute posts which are secured to the floor structure and serve in lieu of separate frame members to support the walls. These posts may be secured to the floor structure in various ways. In the present instance the walls project some distance below the floor structure, as shown in Fig. 6, and the vertical posts are connected with the floor structure by upper foot posts 39 and lower foot posts 40. Each upper foot post comprises a plate 41 which rests upon the floor structure and is rigidly secured to one of the transverse beams 17. Extending upwardly from this plate is a portion 42 which is U-shaped in cross section and which embraces the adjacent post, to which it may be secured in any suitable manner, preferably by the bolts 38 which connect the two members of the joint or post. The lower foot post comprises a downwardly extending portion 43 which is U-shaped in cross section and embraces the adjacent upright joint or post, to which it is rigidly secured, as by means of bolts. It also comprises a transverse portion 44 which is also U-shaped in cross section and embraces the vertical web of the beam 17, the lower flanges of that beam being cut away to permit the foot post to be applied thereto. When, as in the present instance, the foot post is of a uniform width which is greater than the thickness of the web of the beam, filler strips 45 may be inserted between the flanges of the foot post and the web of the beam, the several parts being rigidly connected one to the other by bolts 46.

The outer sides of the several joints are closed by means of cover plates or strips 47 the edges of which overlap the adjacent panels and which are secured in place by the bolts 38 which connect the two parts of the joint. As here shown, each panel has a longitudinal groove 48 adjacent to each joint member and the cover strip 47 has its edges turned inwardly, as shown at 49, and fitted within these grooves, so that the outer surface of the cover strip is substantially flush with the adjacent portions of the panels. The inturned edges of the cover strip grip the side walls of the respective grooves and thus reinforce the joint and prevent the same from spreading under stress.

The top wall or deck 27 is supported by the upright walls of the body. The joints between the panels of the top wall are of the same character as the joints between the vertical panels and are rigidly connected to the vertical joints or posts. The joints or reinforcing bars for the top wall may be secured to the upper ends of the vertical joints or posts in any suitable manner but it is preferable that they should be interlocked with the vertical posts. As has been stated, the end portions of the top panels are turned downwardly and overlap the outer surface of the vertical panels. The transverse reinforcing bars or joints of the top panels are shown in Figs. 6 and 9 as extending to the ends of these panels and are likewise turned downwardly. The joint members for the vertical side walls are preferably assembled, as shown in Fig. 9. There the inner joint member 29 for the vertical panel 25 is placed over the inner joint member 29 of the top panel 27, the two parts fitting snugly in engagement one with the other, due to the resiliency of the material. The outer joint member 34 of the top panel is then placed over the inner joint member of the vertical panel and the outer joint member of the vertical panel placed over the outer joint member of the top panel, thus nesting the several joint members in snug relation, in which position they are rigidly connected by means of one or more of the fastening devices or bolts 38.

In some cases it may be desirable to terminate the joint members of the top panels at points spaced from the ends of the panels to facilitate the bending of the end portions of those panels. In Figs. 12, 13 and 14 there is shown a modified construction in which the top joint members have been cut away along the downturned portions of the top panels so as to leave only narrow flanges along these portions of the panels, as shown at 70. When the top panels are secured to the side panels the flanges 70 of the top panels overlap the adjacent portions of the inner vertical joint members, as shown in Fig. 14, so as to provide a strong interlocking connection between the several panels. The joint thus formed is preferably reinforced by a knee member or U-shaped sleeve 71 which is shaped to fit over the end portion of the joint between the top panels and to extend into the outer vertical joint member, which may be enlarged to receive the same, as shown at 72 in Fig. 12. This knee member may conveniently be secured in place by the bolts 38 which connect the joint members.

The body may be provided with one or more doors which may be of any suitable type and may be arranged in any suitable location. As shown in Fig. 1, a door 50 is substituted for the front panel of one of the side walls of the body. This door is here shown as comprising two vertical sections hinged one to the other, the forward section being hinged to a post 51 which forms part of the front wall of the body, not here shown. When the door is opened the forward section swings outwardly and the rear section folds upon the same, in a well known manner, so that when the door is closed the rear edge of the rear section moves in a substantially longitudinal line. In order to form a door jamb with which this door may be engaged I have inserted in the outer joint member 34, at the forward edge of the adjacent channel, an inner joint member 52 having secured thereto, in lieu of a panel, a forwardly projecting part 53 which is curved inwardly upon itself. Rigidly secured to the transverse portion of the outer joint member is a strip or plate 54 which extends forwardly and is curved outwardly upon itself with its free edge adjacent to the free edge of the part 53, thus providing resilient contact surfaces against which the edge of the door 50 may be engaged to form a tight closure. Preferably the door is provided with glass panels which extend to points near the bottom thereof.

When the invention is embodied in a passenger vehicle the seats may be arranged within the body in any suitable manner and, as here shown, they extend lengthwise of the body. Arranged lengthwise of the side walls, and in the present instance above the seats and beneath the window openings, are face plates 55, which may be curved inwardly to form backs for the seats. Each face plate has at each corner thereof a depressed portion 56 adapted to engage one of the upright joints or posts and to be rigidly secured thereto, by means of bolts or otherwise. When these face plates form seat backs they are usually provided with a covering of leather, fabric or the like, as shown at 57, and in order to secure this covering to the face plate the latter is provided at its upper edge with an outwardly extending flange 58 and at its lower edge with a V-shaped bead 59. An S-shaped clip 60 has its lower portion placed about and firmly gripping the flange 58 while its upper portion grips the edge of the cover material. The lower portion of the covering material extends across the bead 59 and is secured thereto by a clip 61 rigidly secured to the face plate by fastening devices, such as screws 62. The face plate is spaced some distance from the panel with which it is associated and thus provides an enclosed space within which may be mounted the operating mechanism (not shown) for the adjacent window.

The main panels of the vertical walls and top walls are respectively interchangeable but a part of the panels in each instance must be of special construction. As shown in Fig. 1 the front and rear top panels are specially shaped to impart the proper contour to the deck and have joint members at their inner edges only, the outer edge being turned downwardly to overlap the front and rear vertical walls. The vertical panels of the rear and side walls are connected by curved panels which are shown at 63 in Fig. 2 and, in the present instance, the arrangement of panels is such that this curved panel is provided at each edge with an outer joint member instead of having an inner joint member at one edge and an outer joint member at the other edge. If an additional door is required such a door may be substituted either for one of the panels in the rear wall or for a panel in a side wall. If desired, a longitudinal guard rail 64 may be secured to the sides of the body to protect the panels against injury and to further reinforce the side panels. Usually the side panels adjacent to the rear wheels have their lower portions cut away to provide space for the wheel housing, as shown at 73, and the rail is secured to these panels above the wheel housing to rigidly support the same, in lieu of the connection between the lower portion of the post, which has been cut away, and the floor structure.

The lateral edges of the floor terminate at the inner edges of the vertical posts and it is desirable that means be provided to prevent air and dust from passing upwardly between the floor and the panels and thus finding its way into the body. For this purpose each edge of the floor has a downturned flange 75, (Fig. 6), to which is secured one edge of a longitudinally extending clip or bar 76 the other edge portion of which is bent upon itself to form a recess. A strip of flexible material 77 is clamped in this recess and engages the adjacent panel, thus effectively closing the space between the floor and the panel without the use of a rigid connection between those parts.

Not only does this construction provide an easily constructed inexpensive body of a very strong character but it provides a body which may be made in varying lengths by the omission or addition of panels. Even after the body has been constructed and has been in use its length may be increased or decreased by the insertion or removal of panels. To do this it would be only necessary to disconnect the rear side and top panels from the adjacent panels and insert other standard panels between the same, or remove one or more panels, this being readily accomplished because of the character of the connecting devices. The only other change which might be necessary would be the providing of the chassis frame with an extension to correspond to the increased length of the body.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a vehicle body, a wall comprising a plurality of sheet metal panels, each of said panels having at one longitudinal edge thereof a substantially M-shaped joint member and having at its other longitudinal edge a substantially U-shaped joint member, the U-shaped joint member of one panel member embracing the M-shaped joint member of an adjacent panel, to form a combined joint and panel supporting member, and fastening devices to connect said joint members one to the other.

2. In a vehicle body, a wall comprising a plurality of sheet metal panels, each of said panels having at each longitudinal edge thereof an inwardly extending portion bent upon itself to form a joint member which is substantially M-shaped in cross section with the bottom of the M adjacent to the plane of the panel, and each panel also having at its other longitudinal edge an inwardly extending portion bent upon itself to form a joint member which is substantially U-shaped in cross section with the transverse portion of the U spaced from the plane of the panel, the U-shaped joint member of each panel extending about and enclosing the M-shaped joint member of an adjacent panel to form a combined joint and panel supporting member, and fastening devices extending through said joint members to connect the same one to the other.

3. In in a vehicle body having self-supporting walls each formed wholly of a plurality of sheet metal panels, each panel having at each edge thereof a longitudinal portion projecting beyond the surface thereof and forming one member of the joint, the joint members of adjacent panels being arranged in interlocking relation to form a combined joint and supporting member for said panels, and the interlocking members of each joint having opposed parts arranged in planes substantially parallel with the planes of said panels and spaced one from the other in the completed wall, and fastening devices extending through said opposed parts and acting on both joint members to draw the same one toward the other.

4. A vehicle body having a wall comprising a plurality of sheet metal panels, each of said panels having at one edge thereof a longitudinal portion bent upon itself to provide an inner joint member having side walls spaced one from the other, said joint member having parts arranged between said side walls, one of said parts being a transverse portion arranged adjacent to and substantially parallel with the plane of said panel, each of said panels also having at its opposite edge a longitudinal portion bent upon itself to provide an outer joint member having side walls spaced one from the other and connected by a transverse portion spaced from the plane of said panel, each inner joint member fitting within the outer joint member of an adjacent panel and cooperating therewith to form a combined joint and panel supporting member, and fastening devices extending through the transverse portions of the two joint members to draw said joint members one toward the other.

5. A vehicle body having a wall comprising a plurality of sheet metal panels, each of said panels having at one edge thereof a longitudinal portion extending transversely to the surface of said panels and bent upon itself to form an inner joint member having side walls spaced one from the other and converging from the plane of said panel and spaced walls arranged between said side walls, extending from the remote edges thereof toward the plane of said panel and connected by a transverse portion adjacent to said plane, each of said panels also having at its opposite edge a longitudinal portion extending transversely to the surface of said panel and bent upon itself to provide an outer joint member having side walls spaced one from the other and connected by a transverse portion spaced from the plane of said panel, each inner joint member fitting within the outer joint member of an adjacent panel and cooperating therewith to form a panel supporting member and fastening devices extending through the transverse portions of the two joint members and acting thereon in opposite directions to connect said joint members one to the other.

6. A vehicle body having a wall formed wholly of a plurality of sheet metal panels, each of said panels having at one edge thereof a longitudinal portion extending transversely to the surface of said panel, and bent upon itself to provide an inner joint member having side walls spaced one from the other for the full length of said joint member and converging from the plane of said panel, each of said panels also having at its opposite edge a longitudinal portion extending transversely to the surface of said panel and bent upon itself to provide the outer joint member having side walls spaced one from the other, each outer joint member fitting over the inner joint member of an adjacent panel and cooperating therewith to form a panel supporting member, said outer joint member having its side walls so arranged with relation to the walls of said inner joint member that those portions thereof adjacent to said panels will have firm but resilient contact with the converging side walls of said inner joint member and those portions of the side walls of said outer joint member remote from said panels will be spaced from the adjacent portions of the side walls of said inner joint member, said joint members having opposed parts between the respective side walls thereof and spaced one from the other and fastening devices extending through the opposed parts of said joint members substantially parallel with the side walls thereof and acting thereon in opposite directions to draw said joint members into engagement one with the other.

7. A vehicle body having a wall comprising a plurality of sheet metal panels, each of said panels having at one edge thereof a longitudinal portion extending transversely to the surface of said panels and bent upon itself to provide an inner joint member having walls spaced one from the other, each of said panels also having at its opposite edge a longitudinal portion extending transversely to the surface of said panel and bent upon itself to provide an outer joint member having walls spaced one from the other and adapted to receive between them the inner joint member of an adjacent panel, connecting devices acting on said joint members in opposite directions to draw the same into firm engagement one with the other and form a support for said panels, and a cover strip of thin material fitted over the open side of the joint between adjacent panels and secured to said panels to form a continuation thereof.

8. A vehicle body having a wall comprising a plurality of sheet metal panels, each of said panels having at one edge thereof a longitudinal portion extending transversely to the surface of said panel and bent upon itself to form an inner joint member having side walls spaced one from the other, each of said panels also having at its opposite edge a longitudinal portion extending transversely to the surface of said panel and bent upon itself to provide an outer joint member having side walls spaced one from the other, each inner joint member fitting snugly within the outer joint member of an adjacent panel to connect said panels and form a supporting member therefor, each panel having a groove adjacent to and substantially parallel with each joint member, a cover strip having edge portions extending into the grooves of adjacent panels and having its intermediate portion arranged approximately in the plane of said panels, and fastening devices extending through said cover strip and through said joint members substantially parallel with the spaced side walls of said joint members to draw said joint members into firm engagement and to secure said cover strip to said panels.

9. A vehicle body having a wall comprising a plurality of sheet metal panels, each of said panels having at one edge thereof a longitudinal portion extending tranversely to the surface of said panel and bent upon itself to provide an inner joint member having walls spaced one from the other, each of said panels also having at its opposite edge a longitudinal portion extending transversely to the surface of said panel and bent upon itself to provide an outer joint member having walls spaced one from the other and adapted to receive between them the inner joint member of an adjacent panel, said joint members cooperating to form panel supporting members, fastening devices extending through said joint members to draw them into engagement one with the other, said wall having a door opening at the edge of one of said panels, a joint member engaging the joint member at said edge of said panel, and an elongated strip secured to said joint members, said strip and the last mentioned joint member having parts extending toward said door opening and bent one toward the other to form the door jamb.

10. A vehicle body having a floor structure, side walls extending upwardly from and supported wholly by said floor structure and each comprising a plurality of vertical panels, and a top wall supported by said side walls and comprising a plurality of transverse panels arranged in line with and extending across the upper edges of the corresponding panels of said side walls, each of said panels having at one lateral edge thereof an inwardly extending longitudinal portion bent upon itself to form an inner joint member and having at the other lateral edge thereof an inwardly extending longitudinal portion bent upon itself to form an outer joint member, the inner joint member of each panel being arranged within and secured to the outer joint member of an adjacent panel to connect said panels one to the other and form a supporting member therefor, the end portions of said transverse panels and their supporting members being turned downwardly to overlap the upper portions of the respective vertical panels and their supporting members, the inner joint members of each pair of supporting members being arranged one within the other and the outer joint members being arranged one within the other and fitted over the two inner joint members, and means for securing the several joint members one to the other.

11. In a vehicle body having a floor structure, side walls extending upwardly from and supported wholly by said floor structure and each comprising a plurality of vertical panels, and a top wall supported by said side walls and comprising a plurality of transverse panels arranged in line with and extending across the upper edges of the corresponding panels of said side walls, each of said panels having at one lateral edge thereof an inwardly extending longitudinal portion bent upon itself to form an inner joint member and having at the other lateral edge an inwardly extending longitudinal portion bent upon itself to form an outer joint member, the inner joint member of each panel being arranged within and secured to the outer joint member of an adjacent panel to connect said panels one to the other and form a supporting member therefor, the end portions of said transverse panels being turned downwardly to overlap the respective vertical panels and having their supporting members partially cut away, and channel shaped devices to connect the corresponding transverse and vertical supporting members, each connecting device being curved about a transverse axis to correspond to the shape of the adjacent portion of the transverse panel and having an upper portion embracing a part of the transverse supporting member and having a lower portion embracing a part of the vertical supporting member, and fastening devices for securing the connecting devices to both joint members of the respective supporting members.

12. In a vehicle body having a floor structure, side walls extending upwardly from and supported wholly by said floor structure and each comprising a plurality of vertical panels, and a top wall supported by said side walls and comprising a plurality of transverse panels arranged in line with and extending across the upper edges of the corresponding panels of said side walls, each of said panels having at one lateral edge thereof an inwardly extending longitudinal portion bent upon itself to form an inner joint member and having at the other lateral edge an inwardly extending longitudinal portion bent upon itself to form an outer joint member, the inner joint member of each panel being arranged within and secured to the outer joint member of an adjacent panel to connect said panels one to the other and form a supporting member therefor, the end portions of said transverse panels being turned downwardly to overlap the respective vertical panels and having their supporting members partially cut away, and channel shaped devices to connect the corresponding transverse and vertical supporting members, each connecting device being curved about a transverse axis to correspond to the shape of the adjacent portion of the transverse panel and having an upper portion embracing the transverse supporting member and having a lower portion arranged between the inner and outer joint members of the vertical supporting member, and fastening devices for securing said connecting device to both joint members of the respective supporting members.

13. In a vehicle body having a floor structure, an upright wall supported wholly by said floor structure and comprising a plurality of sheet metal panels, each panel having at each vertical edge thereof an inwardly extending portion forming a joint member, the joint members of adjacent panels being secured one to the other in interlocking relation to form combined joints and supporting members for said panels, said supporting members extending across the edge of said floor structure and supporting said panels in spaced relation to said floor structure, foot posts arranged adjacent to the respective supporting members and each having a base portion engaging said floor structure and having a channel-shaped portion extending lengthwise of and embracing one of said supporting members to brace the same against transverse strains, and means for rigidly connecting said foot posts to said supporting members or to said floor structure.

JOHN W. CLEMENTS.